United States Patent [19]

Fischer, Jr.

[11] Patent Number: 4,928,751
[45] Date of Patent: May 29, 1990

[54] COMPUTER CONTROLLED WASTE HEAT RECLAIMER

[75] Inventor: Frank P. Fischer, Jr., New Orleans, La.

[73] Assignee: The Eldon Corporation, Jefferson, La.

[21] Appl. No.: 198,506

[22] Filed: May 25, 1988

[51] Int. Cl.$^5$ .................... F28F 27/00; F28F 27/02; G01K 17/06; B01D 19/00

[52] U.S. Cl. .................... 165/11.1; 165/12; 165/34; 165/47; 374/40; 374/41; 261/130; 261/131; 417/63; 55/73; 55/228

[58] Field of Search .................... 165/12, 11.1, 34, 47; 374/39, 40, 41; 417/63; 55/228, 20, 73; 261/130, 131

[56] References Cited

U.S. PATENT DOCUMENTS

| | | | |
|---|---|---|---|
| 3,593,578 | 7/1971 | Farren | 374/40 |
| 3,631,717 | 1/1972 | Kato | 374/40 |
| 4,455,095 | 6/1984 | Bleiker | 374/39 |
| 4,512,387 | 4/1985 | Rodriguez et al. | 165/47 |
| 4,767,280 | 8/1988 | Markuson et al. | 417/63 |

OTHER PUBLICATIONS

Reiter, Sydney; Industrial and Commercial Heat Recovery Systems, 1983, pp. 90–91.
Bailey Process Application, Heat Rate Computer, Form No. Q500-1, Bailey Meter Co., 1962.

Primary Examiner—John Ford

[57] ABSTRACT

A waste heat reclaimer takes in hot waste gases from stacks or flues, associates them with a primary flow of water, heating the water and cooling the gases. The heated water flows through a heat exchanger transferring that heat to a secondary flow of water. A logic and control unit receives signals from sensors located in the sources of the waste gases, the delivery system of the gases, and the two flows of water. These signals are used to give warnings of insufficient flows, insufficient heat energy gains, and to control the sources of the gases, and to provide the operator with other indications which permit him to obtain more efficiency from the unit while devoting less attention to it.

2 Claims, 1 Drawing Sheet

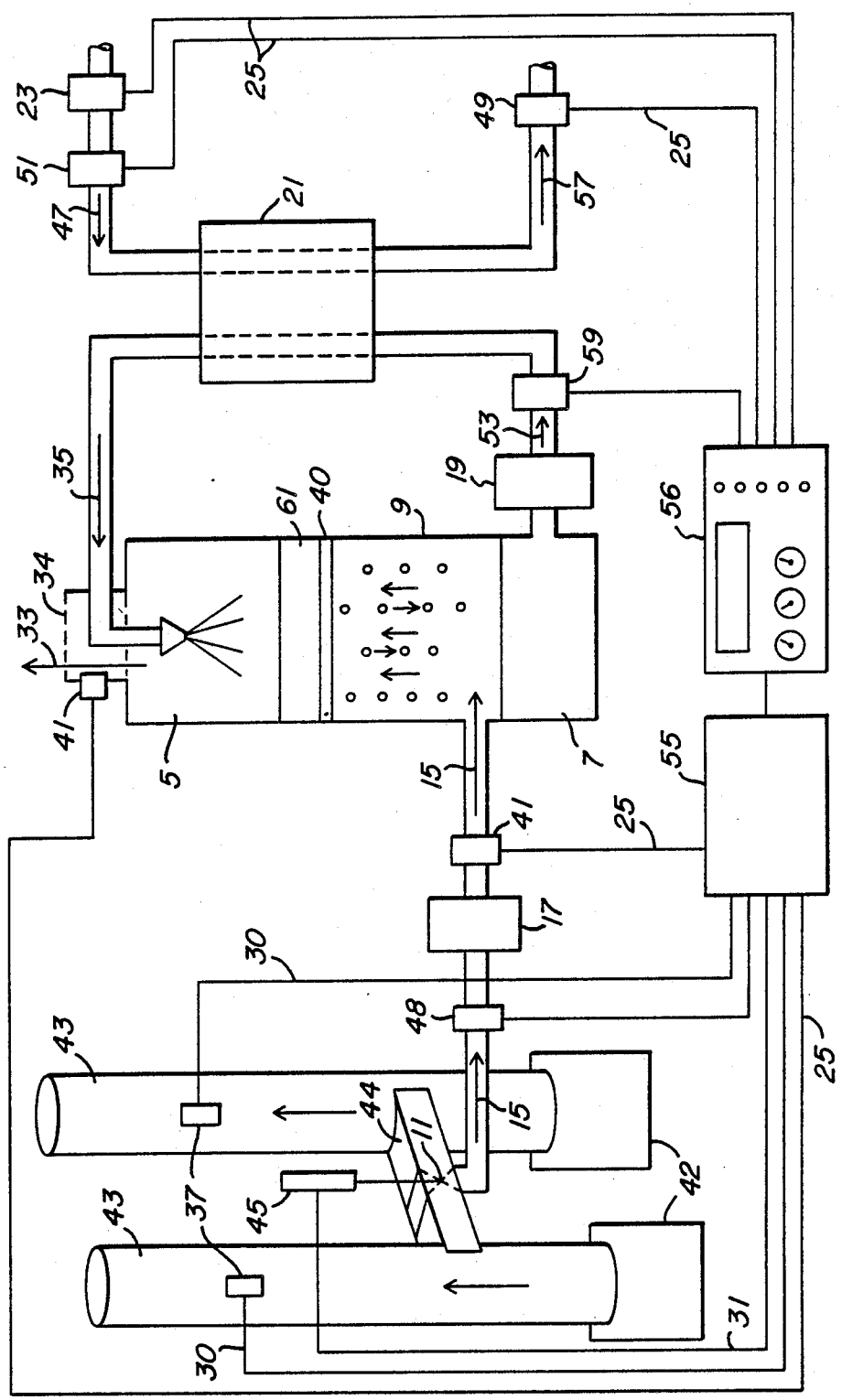

COMPUTER CONTROLLED WASTE HEAT RECLAIMER

FIELD OF THE INVENTION

This invention relates to waste heat reclaiming, and more specifically to waste heat reclaiming of the type in which hot waste gases are directly mixed with water to heat the water for use and to simultaneously cool the gases making them more environmentally compatible.

BACKGROUND OF THE INVENTION

Heat reclaiming systems have long been used in commercial and industrial applications. Hot waste combustion gases from stacks associated with boilers, furnaces and dryers are contacted with cool water in a counter flow path. The water is heated reclaiming some of the heat that would ordinarily escape the stack. The gases are cooled below their adiabatic saturation temperature and below the dew point temperature by evaporation of the water, leaving the gases in a saturated and cooled condition, which improves their effect on the environment.

In one type of known heat reclaimer the gases are delivered to a heat reclaiming chamber by a fan. The gases enter the chamber near the bottom and pass upward and exit to the atmosphere through the top. A primary flow of cool water is sprayed into the chamber near the top onto porous media that assists in the heat transfer. As the gases pass upward through the media, heat is exchanged between the water and the gases, cooling the gases and heating the water, with the attendant advantages described above. The heated water drips off the media and is collected at the bottom of the chamber where it is pumped to an auxillaray heat exchanger to release the heat to a secondary flow of water or the like. In most systems the primary flow of water after it is used as a heating source is recirculated to the top of the chamber, where it is once again sprayed into the chamber.

This system is extremely efficient in reclaiming heat and in improving the gases from an environmental standpoint. However, it is a complicated system that requires close personal monitoring to obtain maximum efficiency and reliability.

STATEMENT OF THE INVENTION

It is the object of the invention to provide a unit generally of the type described, but which is more efficient and easier to accurately monitor.

This and other objects are accomplished by a computer controlled heat reclaiming unit which receives waste gases from a stack or other source, monitors the flow of gases, passes the gases through a heat reclaiming chamber where the heat is reclaimed by a primary flow of water, delivers the heated water to a heat exchanger where it is used to heat a secondary flow of water, monitors the secondary flow of water, monitors the temperature of the secondary flow of water before and after the exchange of heat, and stores the data in a logic and control device so the information can be used effectively.

With this unit many advantages are realized. For example, the monitoring of the system allows the operator access to immediate information as to the efficiency of the system, which permits the operator to make better decisions. Further, the computer is programmable to make decisions freeing the operator and increasing his efficiency.

BRIEF DESCRIPTION OF THE DRAWING

The drawing is a schematic illustration of a computer controlled heat reclaiming unit constructed according to the invention.

DISCLOSURE OF THE PREFERRED EMBODIMENT

Referring to the drawing, stacks 43 are attached to a waste gas producing unit, for example, boilers 42 which produce waste gases 15. The stacks 43 are connected by a connecting conduit 44, from which gases are drawn by a fan 17 and fed to a heat reclaiming chamber 5. A damper 11 controls which stack is connected to chamber 5. As shown, it is open to one of the stacks 43 and closed to the other. The gases 15 enter the heat reclaiming chamber 5 in a mixing zone 9, pass upward through a heat transfer zone 61, where the heat is transferred to a primary flow of water 35. To assist in the heat transfer water 35 is sprayed onto a porous media held on a grid 40. The cooled gases 33 pass out of the chamber 5 into the atmosphere through an exit 34. The water 35 which receives the heat falls through the mixing zone 9 to a storage zone 7 in the bottom of the chamber.

The now heated liquid 53 is then withdrawn from the chamber by a pump 19 and flows to a secondary heat exchanger 21, where it exchanges its heat with a secondary flow of water 47. The now cool primary flow of water 35 recirculates back into the heat reclaiming chamber 5, and is sprayed into the heat transfer zone 61. The secondary flow of water 47, which comes from a cool water source, passes in a heat exchanging relationship with the heated primary flow of water 53 in the secondary heat exchanger 21. The heated secondary flow of water (57 in the drawing) can then be used for any number of applications, as is well known in the art.

A logic and control device 55 which includes a display panel 56 supervises the process through a multiple parameter display, responsive to a number of sensors in the unit. Heat sensors, for example, thermometers 37 in the stacks 43 measure the relative termperatures of the gases 15 in the stacks, sending signals 30 to the control device accordingly. In response to signals 30, the control device 55 sends a signal 31 to a motor 45 which controls the damper 11 to choose from which of the stacks 43 the system will draw gases. It could be set to access either the hotter or the colder stack(or any percentage of each), but preferably is set to access the stack with the hottest gases. If the temperatures are close the unit 55 is programed to not change stacks unless the unused one is at least a minimum temperature, say 10 degrees F., higher than the used stack to prevent continual operation of motor 45.

The actual temperatures sensed by heat sensors 37 are displayed on display panel 56 which also includes a programable display indicating if either of the stacks or the stack being accessed has too high a temperature to be safe or too low a temperature to be worth the cost of operation of the reclamation unit. Although the fan 17 and pump 19 could be shut down in response to either a too high or too low signal, it is preferable merely to actuate a warning when the temperature is too low, but shut down if too high. Alternatively, a hot gas sensor 48 in a conduit between the stacks and the reclaiming chamber 5 can provided the input for this control.

An airflow switch 41, for example, a fan sail type switch, senses the flow of the gases 15 into the heat exchanging chamber 5. Switch 41 can be located as shown in the conduit leading into the chamber 5 or in the exit 34 to chamber 5. A pressure sensing switch 59 verifies the flow of the heated water 53 exiting the chamber 5. The logic and control unit 55 displays a warning signal if these switches indicate that the flow in the respective conduits ceases. Although the entire system could be shut down in response to either of these indicators, it is preferable only to warn the operator, who can take appropriate action, using other readings available in the unit.

A liquid flow meter 23 measures the flow of the secondary flow of water 47 in the secondary heat exchanger 21. A first thermometer 51 measures the temperature of the cool water 47 entering the secondary heat exchanger 21 and a second thermometer 49 measures the temperature of the heated water 57 leaving the exchanger 21. The control unit 55 receives signals 25 from each of the meters, stores those signals and provides displays of their amounts. These displays are available to a sophisticated operator to control pumps in both conduits for maximum efficiency in operation.

With the input and output temperatures and the flow rate of the secondary flow of water, using basic thermal equations, the rate of heat energy being reclaimed can be computed. The control unit 55 is programed to do that calculation and display the BTU output rate of the secondary exchanger. A warning can be set to indicate operation below any level of savings, or BTU output that has been input to the program.

If any of the operating parameters are controllable, the BTU output readings can be used to set them. For example, if the secondary flow of water is variable, it can be adjusted and the BTU output reading used to set it at its optimum level for that system.

Logic and control 55 also includes adequate memory to timelog maintenance on each significant aspect of the system. In general, if is preferable to merely display the gross number of days since a particular component has been serviced, although warnings can also be programmed to be actuated if a particular maintenance schedule is not met.

The invention has been described with regard to a particular embodiment, but variations can be made within its spirit and scope as defined in the appended claims.

We claim:

1. A control device for a heat reclaiming unit, which heat reclaiming unit is of the type which includes:
    a primary heat exchanger for receiving waste gases from a stack or other source and for receiving cool water from a primary source of water and for mixing said gases and water to heat the primary water while cooling the gases,
    a secondary heat exchanger having a secondary flow of water,
    means for delivering the heated primary water to the secondary heat exchanger and into heat exchanging relation with the secondary flow of water to heat the secondary flow of water,
    means for delivering waste gases to said primary heat exchanger, said control unit including:
    means for sensing the temperature of said gases being delivered to said primary heat exchanger and for creating a signal indicative of said temperature,
    means for sensing the temperatures of said secondary flow of water both before it enters heat exchanging relation with said primary flow and after it leaves such heat exchanging relation and for creating electrical signals indicative of said termperatures,
    means for sensing the flow pressure of said secondary flow of water and for creating an electrical signal indicative of said flow pressure,
    means for sensing the flow pressure of the heated primary water and for creating an electrical signal indicative of said flow pressure,
    logic and control means for receiving said signals and displaying indications of the flow pressures and temperatures, said logic and control further including
    means responsive to the sensed temperature of the gases being delivered to the primary heat exchanging means for warning an operator if the gases are below a given low temperature and for shutting off said means for delivering waste gases and said means for delivering primary water if said temperature is above a given high temperature,
    means for warning the operator if the flow pressure in either said means for delivering waste gases or said means for delivering primary water is below a given level indicative that the respective flow has ceased,
    means responsive to said signals indicative of the temperatures and flow pressure of the secondary source of water for calculating the rate of heat energy gain in said secondary flow of water as a result of passing through said secondary heat exchanger, and for displaying the rate of heat energy gain calculated
    means for indicating to an operator that said heat gain amount is below a given amount, and
    means to display an indication of the time since a particular component of said unit has been serviced.

2. The control device according to claim 1 for use to control a unit which includes at least two sources of waste gases, said control device including means for sensing the temperature of gases in each source and for creating an electrical signal indicative of each temperature, and said logic and control including means for comparing the temperatures of gases from said sources and for providing a signal indicative of the source which has the highest temperature gases, and said control device further includes means responsive to said signal for controlling said unit to draw gases only from said hottest source.

* * * * *